US008601262B2

(12) United States Patent
Tariq et al.

(10) Patent No.: US 8,601,262 B2
(45) Date of Patent: *Dec. 3, 2013

(54) LOCATION PRIVACY THROUGH IP ADDRESS SPACE SCRAMBLING

(75) Inventors: Muhammad Mukarram Bin Tariq, San Jose, CA (US); Craig B. Gentry, Mountain View, CA (US); James Kempf, Mountain View, CA (US); Ravi Jain, Mountain View, CA (US); Toshiro Kawahara, Saratoga, CA (US)

(73) Assignee: NTT DoCoMo Inc., Chiyoda-ku, Tokyo (JP)

( * ) Notice: Subject to any disclaimer, the term of this patent is extended or adjusted under 35 U.S.C. 154(b) by 1826 days.

This patent is subject to a terminal disclaimer.

(21) Appl. No.: 11/619,068

(22) Filed: Jan. 2, 2007

(65) Prior Publication Data

US 2007/0104202 A1    May 10, 2007

Related U.S. Application Data

(63) Continuation of application No. 10/284,739, filed on Oct. 31, 2002, now Pat. No. 7,246,231.

(51) Int. Cl.
*H04L 9/00* (2006.01)

(52) U.S. Cl.
USPC ............................. 713/162; 713/160; 713/190

(58) Field of Classification Search
None
See application file for complete search history.

(56) References Cited

U.S. PATENT DOCUMENTS

| 5,673,263 | A | 9/1997 | Basso et al. | |
|---|---|---|---|---|
| 5,732,350 | A | 3/1998 | Marko et al. | |
| 5,754,938 | A * | 5/1998 | Herz et al. | 725/116 |
| 6,055,236 | A | 4/2000 | Nessett et al. | |
| 6,161,180 | A | 12/2000 | Matyas et al. | |
| 6,226,751 | B1 | 5/2001 | Arrow et al. | |
| 6,266,704 | B1 * | 7/2001 | Reed et al. | 709/238 |
| 6,266,707 | B1 | 7/2001 | Boden et al. | |
| 6,317,236 | B1 | 11/2001 | Saunders | |
| 6,463,533 | B1 | 10/2002 | Calamera et al. | |
| 6,591,291 | B1 | 7/2003 | Gabber et al. | |
| 6,717,949 | B1 | 4/2004 | Boden et al. | |
| 6,826,684 | B1 | 11/2004 | Fink et al. | |
| 6,952,769 | B1 | 10/2005 | Dubey et al. | |
| 7,010,604 | B1 * | 3/2006 | Munger et al. | 709/227 |
| 2004/0068647 | A1 * | 4/2004 | Hariharan et al. | 713/153 |

FOREIGN PATENT DOCUMENTS

| CN | 1362822 A | 8/2002 |
|---|---|---|
| EP | 1063811 | * 12/2000 |
| EP | 1126678 | 8/2001 |
| JP | 11-187069 | 7/1999 |
| JP | 2001-261486 | * 9/2000 |

OTHER PUBLICATIONS

Mogul et al.; RFC 950 "Internet Standard Subnetting Procedure," Aug. 1985.*

(Continued)

*Primary Examiner* — Kaveh Abrishamkar
(74) *Attorney, Agent, or Firm* — Haynes and Boone LLP

(57) ABSTRACT

In a network, a router uses some secret information combined with a cryptographic process in determination of a subnet's routing prefix. Several methods are disclosed, including using an IP suffix for prefix generation and for decryption, maintaining a pool of pseudo prefixes at the router, using public key encryption and symmetric key encryption.

64 Claims, 11 Drawing Sheets

(56) References Cited

OTHER PUBLICATIONS

Peterson et al., Computer Networks, Morgan Kaufmann, 2$^{nd}$ edition, Oct. 1, 1999, Chapter 4.*
Freedman et al. "Tarzan: A Peer-to-Peer Anonymizing Network Layer" CCS '02, Nov. 2002.*
Trostle et al., "Cryptographically Protected Prefixes for Location Privacy in IPv6" In: Proceedings of the Privacy Enhancing Technologies Symposium (2004).*
Reiter et al. "Crowds: anonymity for Web Transactions" Nov. 1998; ACM Transactions on Information and System Security vol. 1, Issue 1; pp. 66-92.
Goldberg, Ian Avrum; "A Pseudonymous Communications Infrastructure for the Internet"; Fall 2000; dissertation, University of Callifornia at Berkeley, pp. 1-138.
Peterson et al.; Computer Networks, 2nd edition; 1996; Morgan Kaufmann; Chapter 4.
Cuellar, J., Morris, Jr., John B., Mulligan, D., "Geopriv Requirements," Nov. 2002, pp. 1-24, available online at <http://www.ietf.org/internet-drafts/draft-ietf-geopriv-reqs-01.txt>-;.
Goldschlag, David M., Reed, Michael G., Syverson, Paul F., "Hiding Routing Information," Information Hiding, R. Anderson (editor), Springer-Verlag LLNCS 1174, May 1996, pp. 137-150, available online at <http://www.onion-router.net/Publications/IH-1996.pdf>.
Goldschlag, David M., Reed, Michael G., Syverson, Paul F., "Onion Routing for Anonymous and Private Internet Connections," Communications of the ACM, vol. 42, No. 2, Feb. 1999, pp. 1-5, available online at <http://www.onion-router.net/Publications/CACM-1999.pdf>.
Goldschlag, David M., Reed, Michael G., Syverson, Paul F., "Privacy on the Internet," INET '97, Kuala Lumpur, Malaysia, Jun. 1997, pp. 1-10, available online at <http://www.onion-router.net/Publications/INET-1997.html>.
Jain, Ravi, "Phone Number Portability for PCS Systems with ATM Backbones Using Distributed Dynamic Hashing," IEEE Journal on Selected Areas in Communications, vol. 15, No. 1, Jan. 1997, pp. 96-105.
Reed, Michael G., Syverson, Paul F., Goldschlag, David M., "Anonymous Connections and Onion Routing," IEEE Journal on Selected Areas in Communication Special Issue on Copyright and Privacy Protection, 1998, pp. 1-15, available online at <http://www.onion-router.net/Publications/JSAC-1998.pdf>.
Reed, Michael G., Syverson, Paul F., "Onion Routing," Proceeding of AIPA '99, Mar. 1999, p. 1, available online at <http://www.onion-router.net/Publications/AIPA-1999.pdf>.
Reed, Michael G., Syverson, Paul F., Goldschlag, David M., "Protocols using Anonymous Connections: Mobile Applications", Security Protocols, 5.sup.th International Workshop Proceedings, B. Christianson, B. Crispo, M. Lomas, and M. Roe (editors), Springer-Verlag LLNCS 1361, 1998, pp. 13-23, available online at <http://www.onion-router.net/Publications/WSP-1997.pdf>.
Reed, Michael G., Syverson, Paul F., Goldschlag, David M., "Proxies for Anonymous Routing" Proceedings of the 12.sup.th Annual Computer Security Applications Conference, IEEE CS Press, San Diego, CA, Dec. 1996, pp. 95-104, available online at <http://www.onion-router.net/Publications/ACSAC-1996.pdf>.
Soliman, Hesham, Castelluccia, Claude, El-Malki, Karim, Bellier, Ludovic, "Hierarchical Mobile IPv6 Mobility Management (HMIPv6)," IEFT Mobile IP Working Group, Internet-Draft, Oct. 2002, pp. 1-29, available online at <http://www.iesg.org/internet-drafts/draft-ietf-mobileip-hmipv6-07.txt->.
Syverson, Paul F., Goldschlag, David M., Reed, Michael G., "Anonymous Connections and Onion Routing," Proceedings of the 18.sup.th Annual Symposium on Security and Privacy, IEEE CS Press, Oakland, CA, May 1997, pp. 44-54, available online at <http://www.onion-router.net/Publications/SSP-1997.pdf>.
Syverson, Paul F., Reed, Michael G., Goldschlag, David M., "Onion Routing Access Configurations," DISCEX 2000: Proceedings of the DARPA Information Survivability Conference and Exposition, vol. 1 Hilton Head, SC, IEEE CS Press, Jan. 2000, pp. 34-40, available online at <http://www.onion-router.net/Publications/DISCEX-2000.pdf>.
searchNetworking.com release titled, "router—s searchNetworking definition," printed from the Internet web site at <http://searchnetworking.techtarget.com/sDefinition/0,,sid7.sub.--gci2-12924,00.html>, on Oct. 22, 2002, 2 pages.
searchNetworking.com release titled, "IP network design, part 3: IP addressing and routing," by Long, Cormac, dated Apr. 26, 2001, printed from the Internet web site at <http://searchnetworking.techtarget.com/originalContent/0,289142,sid7.-sub.--gci803101,00.html>, on Oct. 22, 2002, 6 pages.
searchNetworking.com release titled, "host—a search WebServices definition", printed from the Internet web site at <http://searchwebservices.techtarget.com/sDefinition/0,,sid26.sub.--gc-i212254,000.html>, on Oct. 22, 2002, 3 pages.
Kent et al., "Security Architecture for the Internet Protocol", The Internet Society, Nov. 1998, pp. 1-60.
Peterson et al., "Computer Networks: A Systems Approach", Morgan Kaufmann Publishers, Oct. 1, 1999, 2.sup.nd Ed., pp. 68-168 and 248-366.
Stallings, W., "Cryptograpy and Network Security," Prentice Hall, Inc., 1999, 2.sup.nd Ed., pp. 21-47, 163-199, 237-269, 299-319.
Schneier, B., "Applied Cryptography" John Wiley & Sons, Inc. 1996, 2.sup.nd Ed., pp. 169-187.
Droms Bucknell University R: "Dynamic Host Configuration Protocol; rfc2131.txt" IETF Standard, Internet Engineering Task Force, Mar. 1, 1997 XP015007915.
Supplementary European Search Report, EP Application No. 03 81 0808, dated Feb. 4, 2010, 3 pages.
Office Action dated Jan. 8, 2010 in Chinese Patent Application No. 200710136806.3, 7 pages.
English Translation of Office Action dated Jan. 8, 2010 in Chinese Patent Application No. 200710136806.3, 11 pages.
English Translation of JP 11-187069, 14 pages.
Kempf, James et al. "Securing IPv6 Neighbor Discovery Using Address Based Keys (ABKs)" Jun. 2002, 22 pages.
English Translation of CN 1362822, 12 pages.
Letter dated Apr. 19, 2010 from Michael Shenker to CCCPIT Patent and Trademark Law Office in counterpart Chinese Patent Application No. 200710136806.3, 9 pages.
Notice of Reasons for Refusal for Japanese Patent Application No. 2004-550173, dated Jul. 14, 2009, 2 pages.
English Language Translation of Notice of Reasons for Refusal for Japanese Patent Application No. 2004-550173, dated Jul. 14, 2009, 2 pages.
English Language Abstract for JP Patent Publication No. 11-187069, dated Jul. 9, 1999; 6 pages.
Kempf, James; Gentry, Craig; Silverberg, Alice Securing IPv6 Neighbor Discovery Using Address Based Keys (ABKs), Jun. 2002, 18 pages.

\* cited by examiner

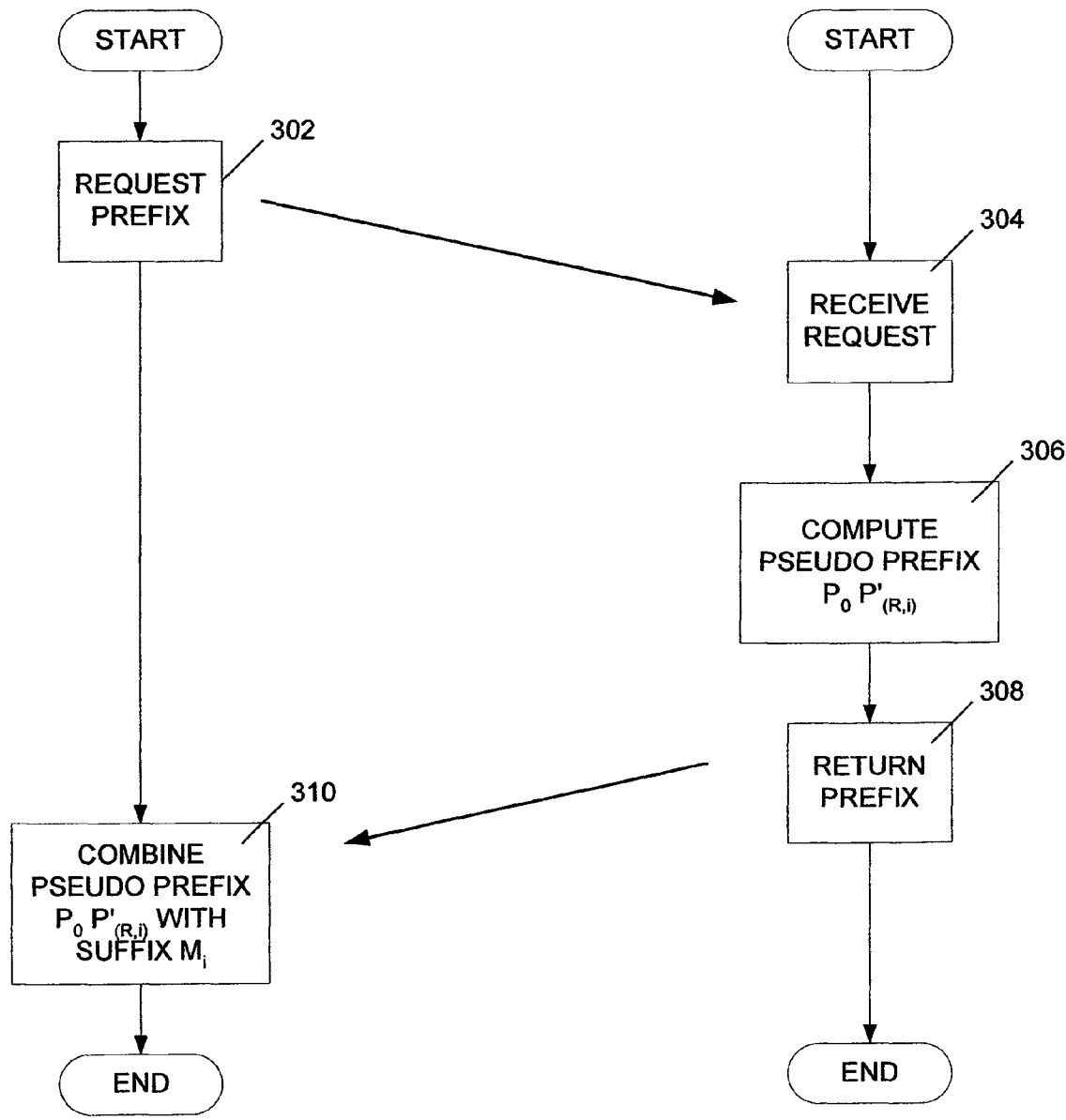

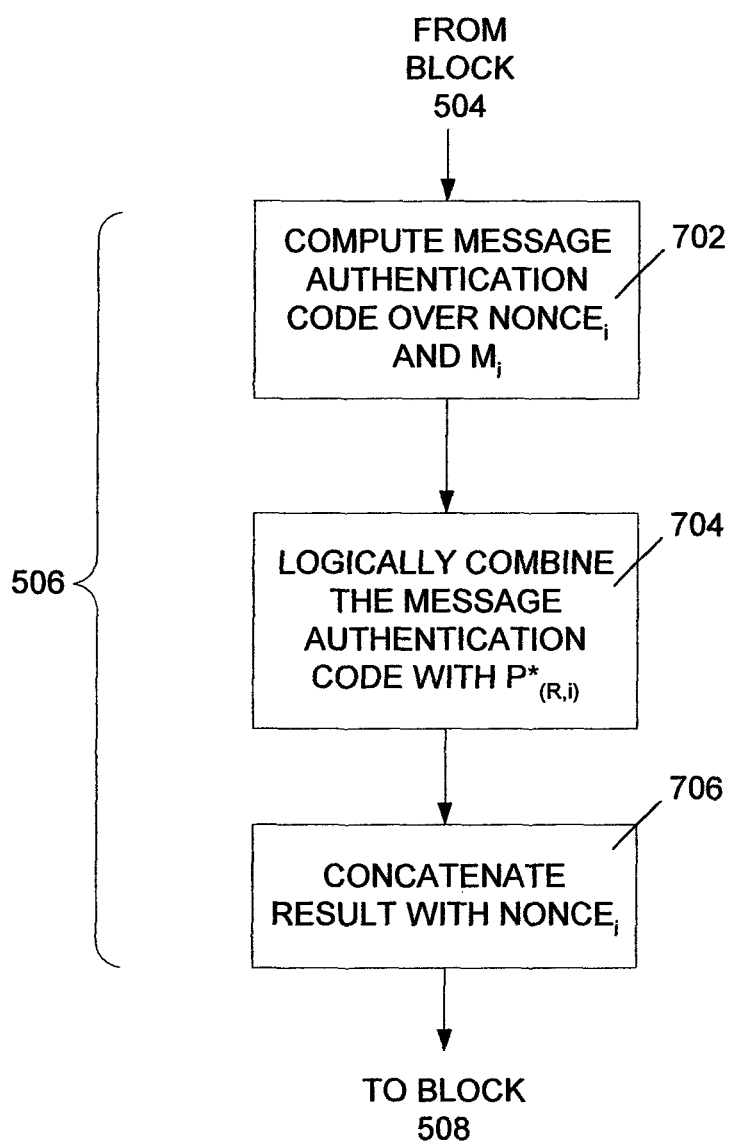

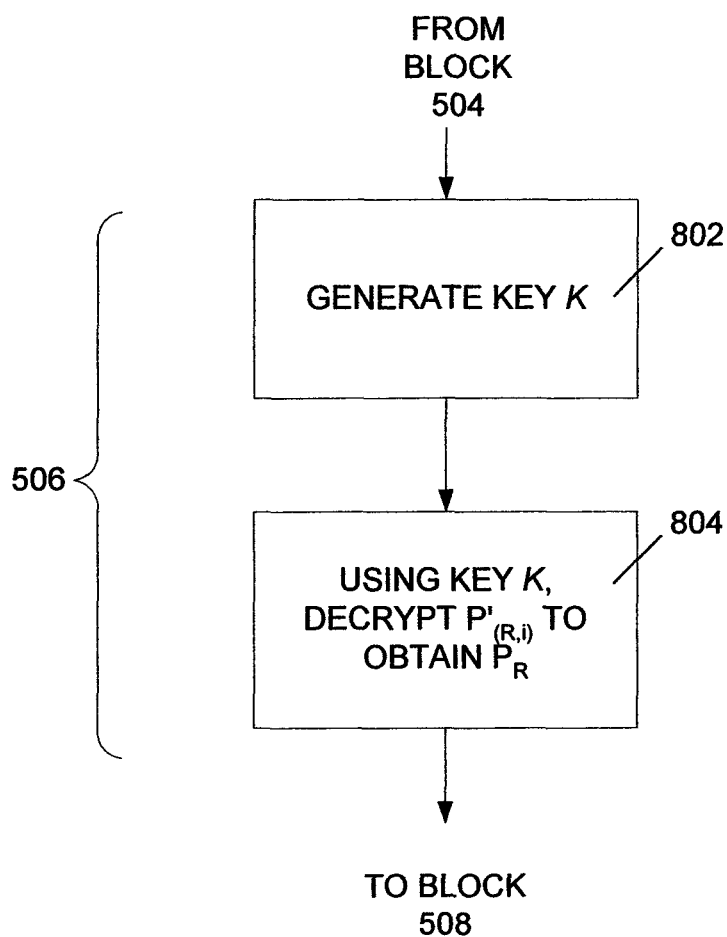

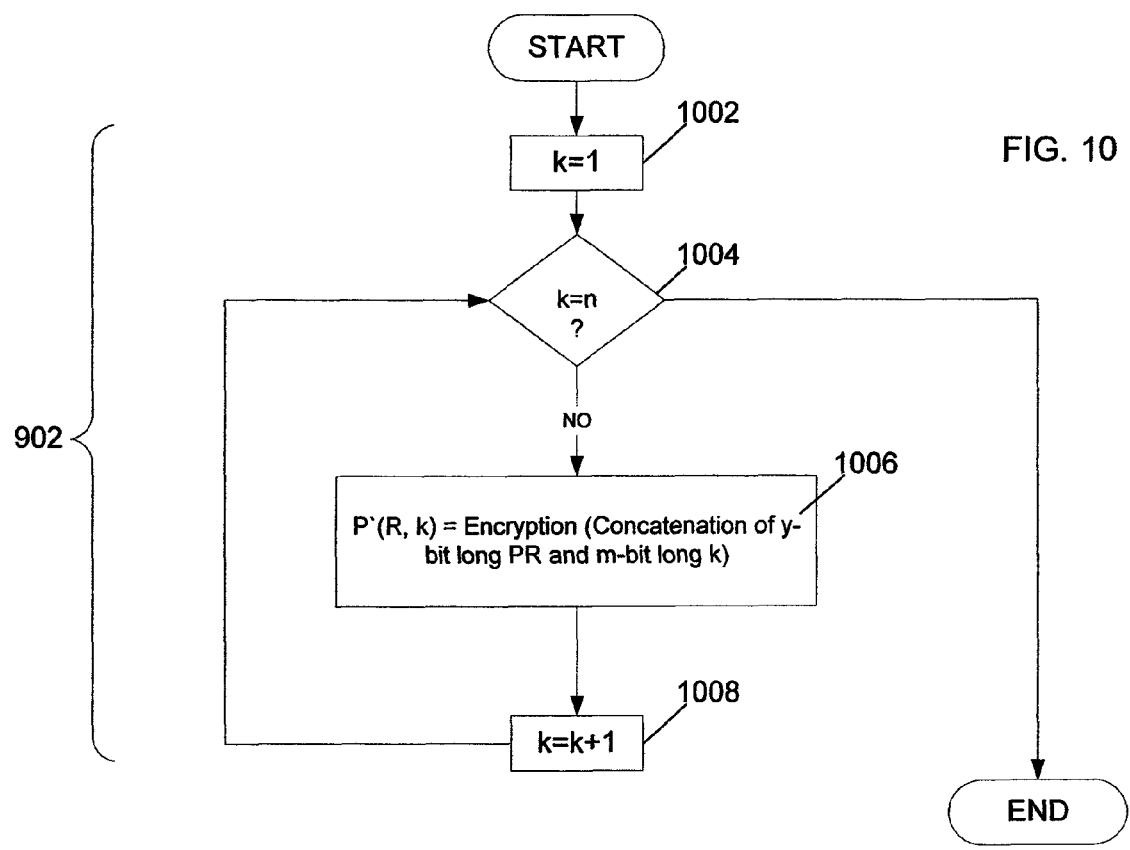

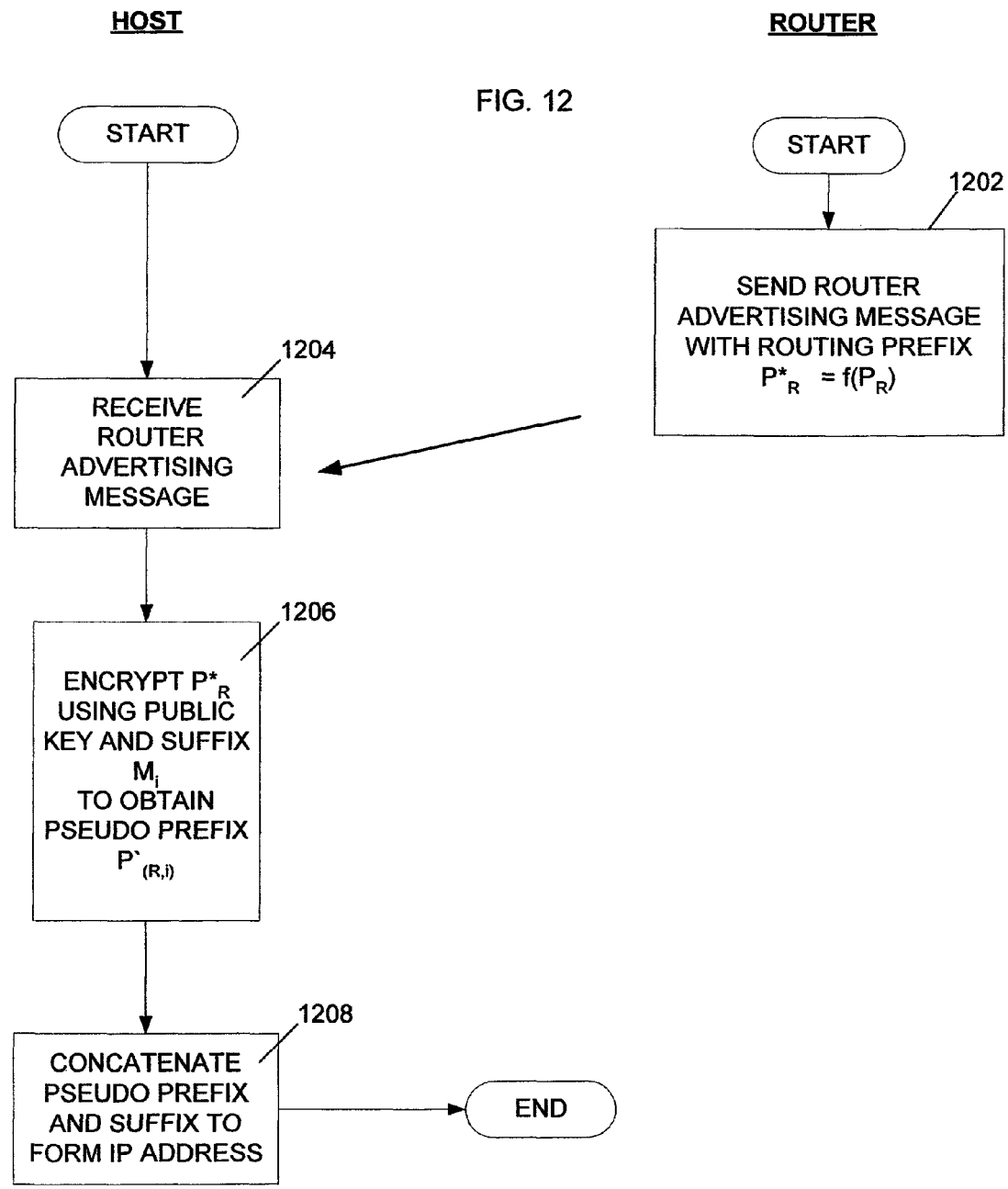

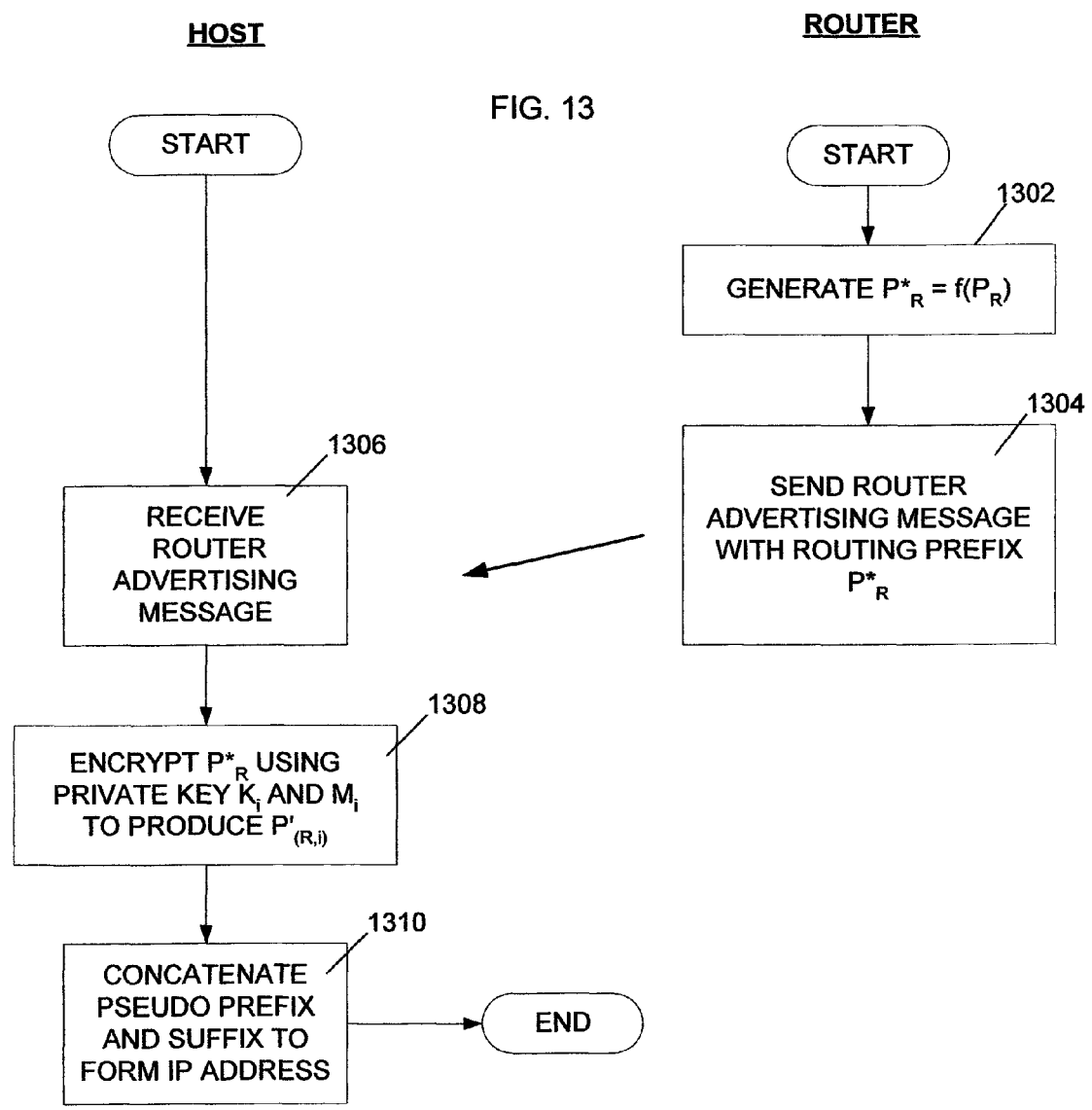

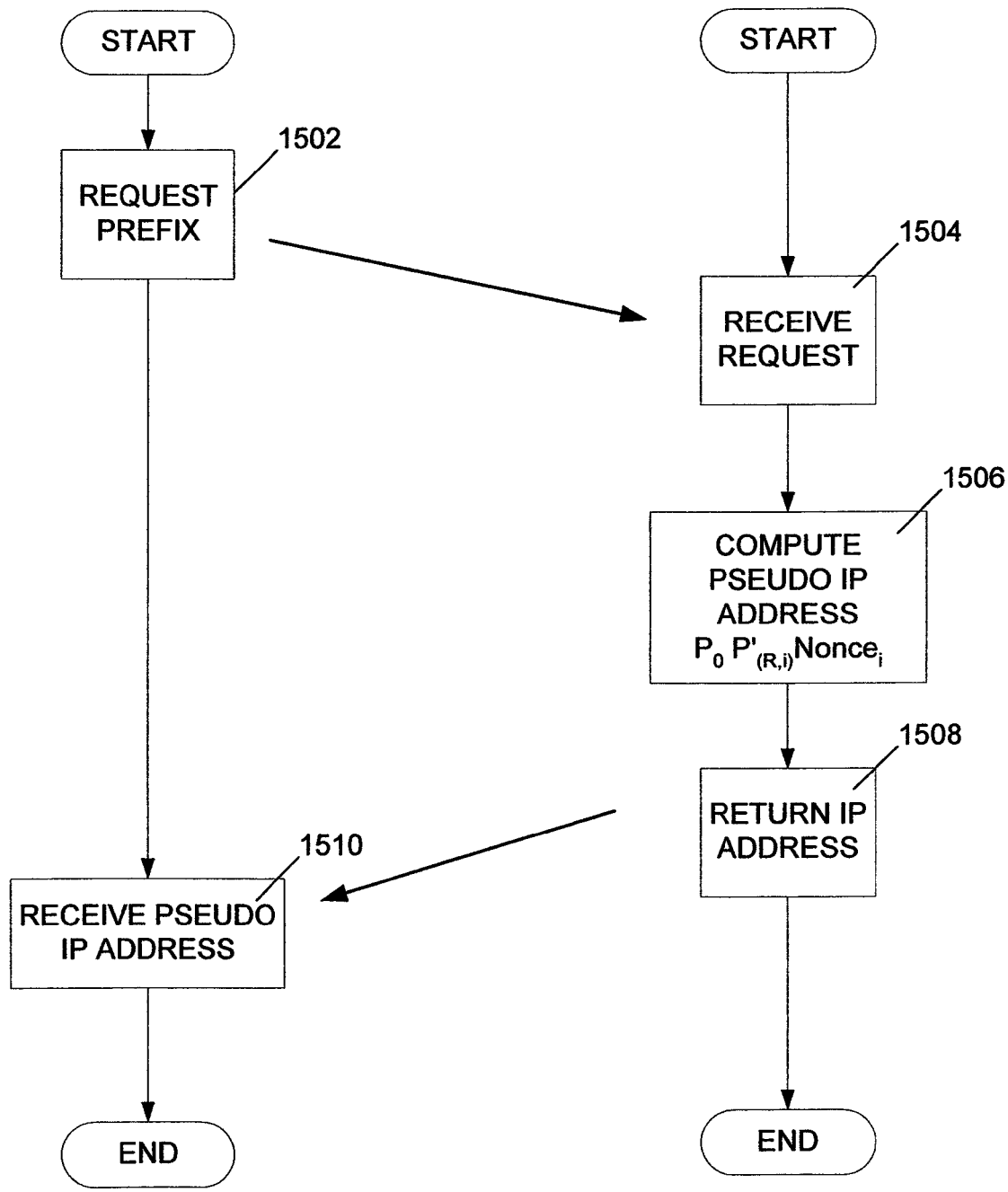

LOCATION PRIVACY THROUGH IP ADDRESS SPACE SCRAMBLING

CROSS REFERENCE TO RELATED APPLICATION

The present application is a continuation of U.S. patent application Ser. No. 10/284,739, filed Oct. 31, 2002 now U.S. Pat. No. 7,246,231, incorporated herein by reference.

BACKGROUND

The present invention relates generally to network communication. More particularly, the present invention relates to maintenance of location privacy during network access through IP address space scrambling.

Internet Protocol (IP) allows any hosts on an IP network to have end-to-end communication between them if they know each other's IP address. An IP network generally includes one or more switches or routers and two or more hosts. The hosts communicate over a wire line or wireless link with a router. Routers similarly communicate with other routers and hosts. Generally, all communication is by internet protocol.

Each IP message consists of one or more IP packets. Header information in the IP packets identifies the sender, the recipient and allows the entire IP message to be reconstructed from the IP packets. The IP packets are independent and discrete and may not be routed from sender to receiver over the same path in the network. In an IP network, a sender can send IP packets to a receiver by setting a destination IP address in the IP packet header to the IP address of the intended receiver. Once the packet is injected in the IP network, routing mechanisms try to deliver the packet to the destination host.

The information contained in the Destination IP Address field of an IP packet is what enables the routing mechanism of the network to deliver the IP packet to its intended recipient. An IP address is structured in a Prefix-Suffix format. The prefix part of the IP address contains the subnet-prefix of the destination subnet, indicating where the packet ought to go. Routers make routing decisions, such as selection of the link on which the packet needs to be sent, by looking at the destination subnet prefix contained in the IP address and matching it against a routing table maintained at each router. There are a large number of routing protocols in use in different parts of the Internet such as RIP, OSPF, and BGP etc, which are used for communication among routers and for building valid and up to date routing tables.

Currently, matching the destination subnet prefix from the destination IP address against the routing table is a very simple process. A router applies a mask function on the IP address to obtain the prefix and then searches in the routing table for the entry with longest match to this prefix. Once the entry is found, the packet is routed or sent out on the link described in that routing table entry.

While the inherent simplicity of this process allows the routers to process packets very quickly, and enables them to handle large amounts of traffic, it also creates some potential problems. These problems are becoming more and more important and significant as networks including the Internet become a primary means of communication.

One such problem is location privacy. This problem stems from the fact that most of the subnets, especially stub-subnets, usually have a fixed association with a fairly small geographical area. Due to the fixed nature of this association, a fairly accurate database of subnet-prefix-to-location mappings may be built. Thus, the user loses a substantial portion of the user's location privacy. It is possible to identify the geographic location of the user, even when that location is changing over time because the user is geographically mobile.

As noted, internet protocol requires hosts to know each other's IP addresses for true end-to-end communication in the network. In other words, a host cannot communicate with other host in end-to-end fashion without actually revealing its location. This is because inferring a subnet-prefix from a given IP address is extremely easy, and subnet-prefixes correspond to geographical locations.

Accordingly, a need exists to solve the above mentioned location privacy problem.

SUMMARY

By way of introduction only, one current limitation on location privacy for a network user is that a network address such as an IP address includes the destination subnet information in plain and easily inferable form. Location information may be extracted by applying a very simple mask function to determine the corresponding subnet.

In one embodiment, then, the simple mask function applied to an IP address is replaced with a cryptographic function. In this embodiment, the IP address is formed in a way that its corresponding destination subnet cannot be determined using a simple mask function. Instead, the router uses some secret information or key combined with a cryptographic process to determine the routing prefix for the corresponding subnet. Using this scheme, any entity that does not know the secret information cannot determine the corresponding subnet prefix for a given IP address. This scheme can also be used to reduce correlation between the IP addresses of hosts within a subnet.

The foregoing summary has been provided only by way of introduction. Nothing in this section should be taken as a limitation on the following claims, which define the scope of the invention.

BRIEF DESCRIPTION OF THE DRAWINGS

FIG. 3 is a flow diagram illustrating operation of the network of FIG. 1 in accordance with a first embodiment;

FIG. 7 illustrates calculation of a routing prefix in accordance with a second embodiment;

FIG. 8 illustrates calculation of a routing prefix in accordance with a third embodiment;

FIG. 10 illustrates a method for computing a set of pseudo prefixes;

FIG. 12 illustrates a method for generating prefixes using public key cryptography;

FIG. 13 illustrates a method for generating prefixes using symmetric key cryptography;

FIG. 15 is a flow diagram illustrating operation of the network of FIG. 1.

DETAILED DESCRIPTION OF THE PRESENTLY PREFERRED EMBODIMENTS

Figure 1:
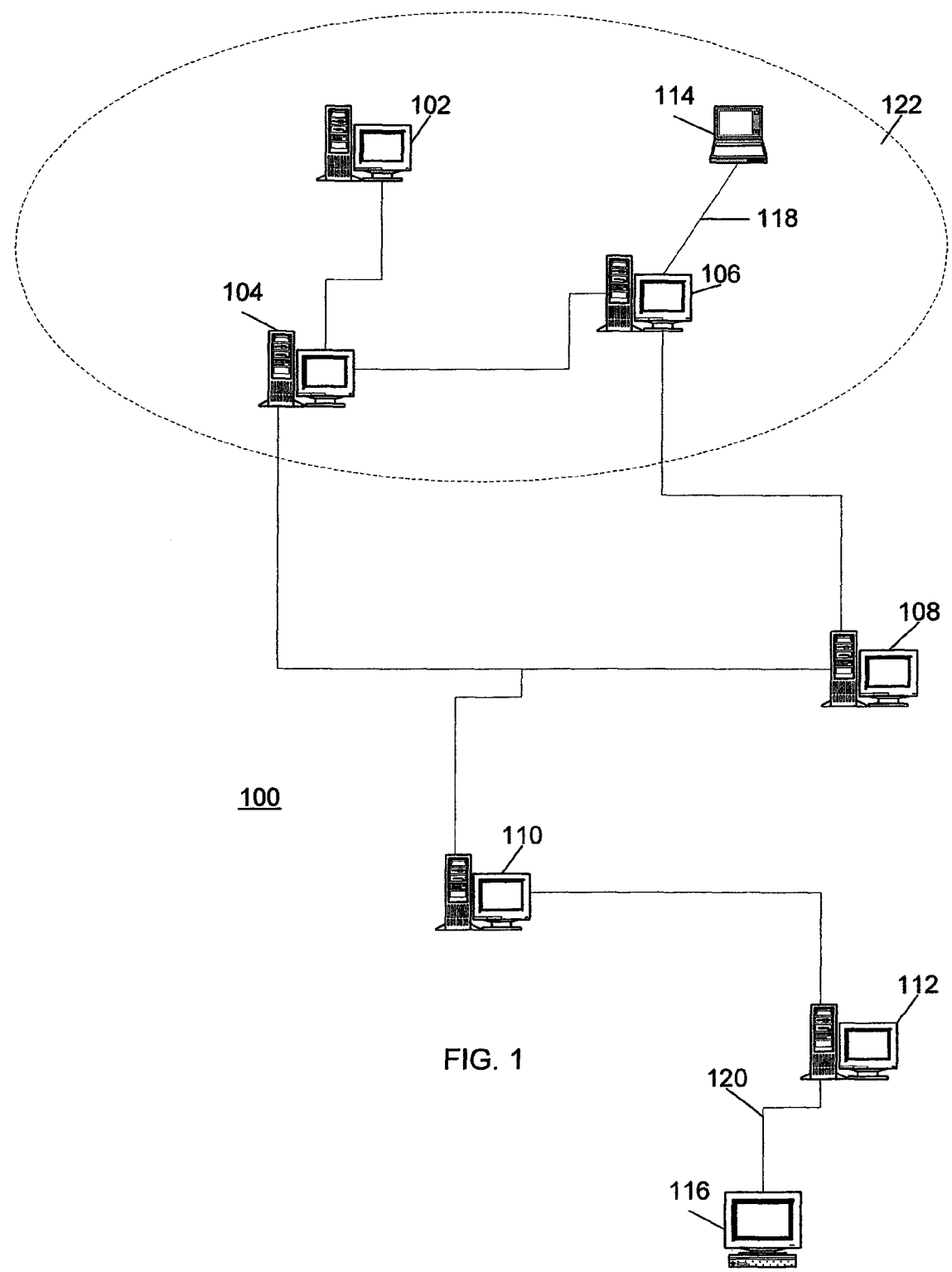
FIG. 1 is a block diagram illustrating a network.

Referring now to the drawing, FIG. 1 is a block diagram illustrating a network 100. The network 100 includes a plurality of switches or routers, including router 102, router 104, router 106, router 108, router 110, router 112, and two or more hosts including host 114 and host 116. The network 100 may be any public or private network for data communication. In the exemplary embodiment, the network 100 communicates packets of data in accordance with transmission control protocol/internet protocol (TCP/IP). Other data formats and communication protocols may be substituted, or exist in addition to the TCP and IP.

Moreover, the configuration of the network 100 is exemplary only. The number of routers and hosts in the network and the individual interconnections of these devices are arbitrary and may change over time. Individual connections among the network devices use any appropriate technology, such as Ethernet, T1 or integrated services digital network (ISDN). The network 100 may have access to the Internet. Networks may include sub-networks or subnets. Subnets themselves may include one or more smaller subnets. The terms network or sub-network or subnet may be used interchangeably. A subnet which does not include smaller or nested subnets or does not serve as a transient network (interconnecting network) between two or more subnets is usually called a stub-subnet.

The routers 102, 104, 106, 108, 110, 112 are devices or software that determine the next network point to which a received data packet should be forwarded toward its destination. Each router is connected to at least two branches of the network 100 and decides which way to send each information packet based on the router's current information about the state of the network. A router is generally located at any gateway, where one network meets another. A router may be included as part of a network switch.

A router may create or maintain a table of available routes and their conditions, and use this information along with distance and cost algorithms to determine the best route for a given packet. A packet is the unit of data that is routed between an origin and a destination of the network. In one exemplary embodiment, when any file is sent from an origin network location to a destination network location, the transmission control protocol layer of TCP/IP divides the file into packets for routing. Each of these packets is separately numbered and includes the network address of the destination. A network address or IP address is a unique location on the network. The address may be expressed as a unique string of numbers or as an associated domain name.

Each subnet on the network has one or more identifiers or network numbers. These numbers are referred to as the subnet prefix or simply prefix. Any subnets within a larger subnet also have their unique prefixes. Usually, the prefixes of the smaller (or nested) subnets are equal to or longer in length than the prefix of their larger subnet. Moreover, in general practice, prefixes of all the smaller subnets contain one of the prefixes of the larger subnet in its entirety. Thus the prefix of a smaller subnet is usually a combination of the prefix of the larger subnet (within which the smaller subnet is nested) and some other number.

A host, such as the host 114 and the host 116, is connected to other hosts on the network 100. Each host is associated with a sub-network or subnet. The host 114 is associated with the subnet 118 and the host 116 is associated with the subnet 120. Each host has a specific local or host number (usually referred to as a suffix) that, combined together with the network or subnet number (usually referred to as a subnet prefix, or just prefix), forms the host's unique IP address.

As noted above, hosts and their subnet generally have a common geographic location. As noted, the location of a host and a subnet may be inferred by applying a mask function. A mask function is conventionally used by a router to separate the suffix from the prefix and route a packet by comparing to entries in a routing table. A similar mask function may be used to obtain the location of the destination subnet.

In the network 100, to provide location privacy, the simple mask function is replaced by a cryptographic function on some of the routers. Each of these routers uses secret information or data combined with a cryptographic process to determine a corresponding subnet's routing prefix. Any entity that does not know the secret information cannot determine the corresponding subnet prefix.

For a router to decrypt the subnet routing prefix from a given IP address, the subnet routing prefix must first be encrypted in the IP address. Thus, IP addresses must be assigned carefully to ensure that when a router applies the decryption on the IP address, the result is the correct or desired routing prefix.

In the example of FIG. 1, a privacy domain 122 is defined. A privacy domain is a sufficiently large set of interconnected routers or a large subnet. In FIG. 1, the privacy domain 122 includes router 102, router 104 and router 106. In other embodiments, and in other privacy domains that may be defined on the network 100, more or fewer routers may be designated as members of the privacy domain.

It is assumed that all routers in a privacy domain 122 can be keyed and periodically re-keyed with some shared secret. The secret may be data having a particular format or content. Keying and re-keying may be done automatically or manually.

Figure 2:
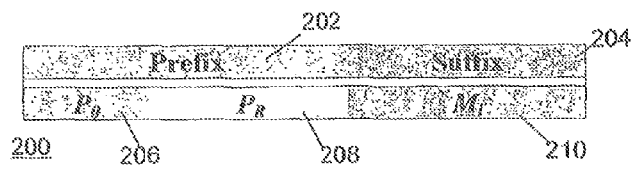
FIG. 2 illustrates an internet protocol (IP) address format.

FIG. 2 illustrates an internet protocol (IP) address format 200. The address 200 includes a prefix 202 and a suffix 204. The prefix 202 includes a privacy domain prefix portion 206, labeled $P_0$, and a routing prefix portion 208, labeled $P_R$. The privacy domain prefix portion $P_0$ 206 is associated with the privacy domain. All hosts and all subnets within a privacy domain share a common privacy domain prefix portion $P_0$ 206. In some embodiments, $P_0$ is 16 bits long, but any length may be assigned and the length may be changed dynamically. All hosts in the privacy domain preferably share $P_0$ as the first prefix, so that any packets that originate outside of the privacy domain can be routed to the privacy domain. Every router inside the privacy domain has a unique routing prefix portion $P_R$ 208. The prefix $P_R$ is conventionally 48 bits long, but any length may be used. Every host, indexed as hosts, is allowed to configure the suffix 204 for its IP address 200. The configured suffix 210 is labeled $M_i$. The suffix is conventionally 64 bits in length, but any length may be chosen.

In the exemplary embodiment, the network cannot exercise any control on how the 64 bit suffix portion of the IP address 200 is configured by a host. A host can use any value for the suffix 210 so long as the value is unique within a subnet, i.e. not used by any other host on the subnet. Any conventional method of ensuring uniqueness may be used, such as Duplicate Address Detection and a Host/Neighbor Table.

FIG. 3 is a flow diagram illustrating operation of the network of FIG. 1. In this embodiment, a host i needs to configure a new IP address. This may happen when a host moves to a new subnet or detects availability of a new router, or upon expiration of a previously assigned IP address, or for any other reason. The host i will reconfigure the prefix to $M_i$. Instead of using the prefix advertised by the router in Router Advertisement Messages, to complete its IP address, the host solicits a prefix from the router, or from a DHCP server or any other suitable address management entity, block 302. As used herein, "router" indicates a router, DHCP server, data switch, server or any other address management entity and their equivalents. The request is received at the router at block 304.

At block 306, the router computes a pseudo prefix. The router has an assigned routing prefix $P_R$. The router computes the pseudo prefix $P_0 P'_{(R,i)}$ and, at block 308, communicates it to the host. The subscript (R, i) signifies that the prefix P' is separately computed for each host with a router, and every router for a host. That is to say that it is likely to be different for every combination of router and host. Different ways of computing $P'_{(R,i)}$ will be described below. The host uses $P_0$, $P'_{(R,i)}$ and its suffix $M_i$ to configure its complete IP address.

Figure 4:
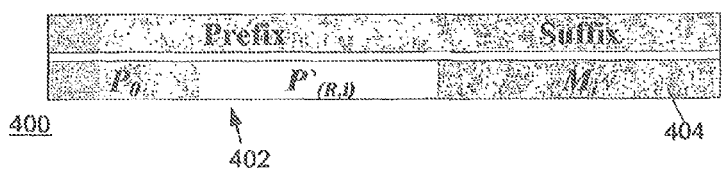
FIG. 4 illustrates an IP address configured by a host using a pseudo prefix provided by a router in response to a request by the host.

FIG. 4 illustrates an IP address 400 configured by the host using the pseudo prefix from the router. The IP address 400 includes a prefix 402 and a suffix 404. The prefix includes the concatenation of the privacy domain subnet prefix portion $P_0$ and the pseudo prefix portion $P'_{(R,i)}$. The suffix $M_i$ 404 is combined with the prefix to form the IP address 400.

Figure 6:
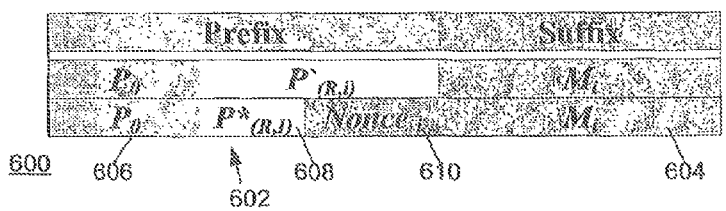
FIG. 6 illustrates an assigned IP address 600 in accordance with a second embodiment.
Figure 5:
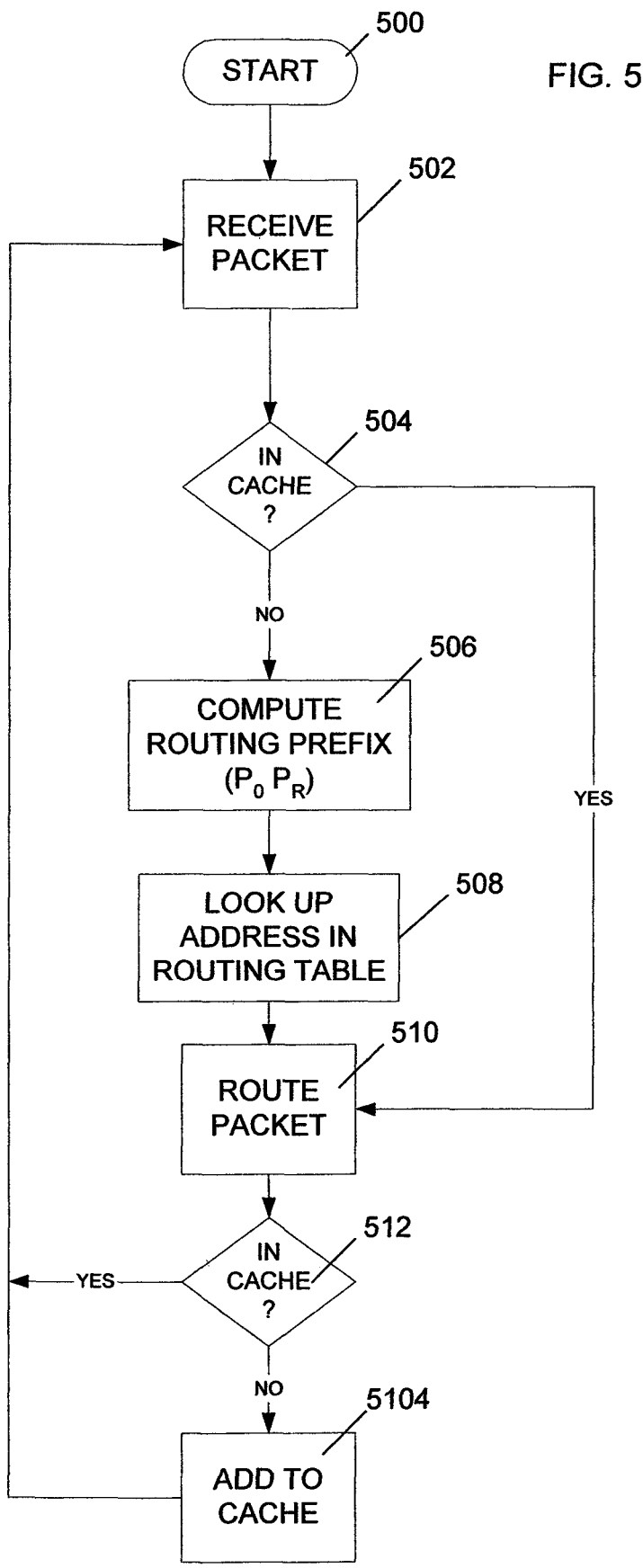
FIG. 5 illustrates calculation of a routing prefix in accordance with a first embodiment.

FIG. 5, FIG. 6 and FIG. 7 illustrate exemplary embodiments by which the router may compute the pseudo prefix $P'_{(R,i)}$. Preferably, all routers in a common privacy domain use the same prefix computation method.

In a first exemplary embodiment, the assigned prefix is obtained by logically combining the host's suffix $M_i$ with the routing prefix $P_R$ for the router or subnet and a shared secret key. This key is shared among all the routers in the privacy domain. Any appropriate logical combination may be used. In the exemplary embodiment, an exclusive OR (XOR) function is used. Thus, the pseudo prefix $P'_{(R,i)}$ is computed as $$P'_{(R,i)} = (\text{Secret} \oplus P_R \oplus M_i)$$

The full IP address is then configured by the host i by concatenating the suffix $M_i$ selected by the host with the pseudo prefix $P'_{(R,i)}$. The host i can use the IP address ($P_0$, $P'_{(R,i)}$, $M_i$) for communication with any other host within or outside the privacy domain. When an ordinary router outside the privacy domain encounters a packet destined for IP address ($P_0$, $P'_{(R,i)} M_i$), it applies the traditional Mask function. The longest possible prefix match in routing table of any router outside the privacy domain can be $P_0$. So the router routes the packet to a link going to prefix $P_0$. Eventually the packet arrives at a router inside the privacy domain. If a packet destined for a host in privacy domain, originated inside privacy domain it may never actually go to a router outside that privacy domain. When a router inside the privacy domain encounters this packet, it can compute the actual routing prefix $P_0 P_R$ for this packet by XOR-ing the $P'_{(R,i)}$ and $M_i$, which are already contained in the IP address, with the shared secret key. Once the actual prefix is determined, the router uses conventional routing table lookup to make the actual routing decision.

The routers in the privacy domain may cache the results of the prefix computation for a given IP address, to avoid re-computing the routing prefix for every packet and speed up the routing process. The cached values must be invalidated if the secret used for the computation is changed, for example, during a re-keying. Routers may have limited caching capacity. In that case, they may not be able to persistently cache the results. Instead they may erase some previously cached entries to make room for new ones. Which entries to keep and which ones to erase may be dictated by a cache replacement algorithm. Several cache-replacement algorithms have been studied over years.

FIG. 5 illustrates this process. The method begins at block 500. At block 502, a packet is received at a router of the privacy domain. At block 504, the router determines if the actual routing prefix corresponding to the pseudo prefix $P_0 P'_{(R,i)}$ has been calculated and stored in cache memory. If so, control proceeds to block 510. If not, at block 506, the routing prefix is computed. At block 508, a routing table lookup is performed to decide the actual address for routing the packet. The packet is routed at block 510. Subsequently, at block 512, the router is determined if the prefix has been stored in the cache. If so, control returns to block 502 for receipt of a next packet. If the prefix has not already been cached, at block 514 the prefix is stored in memory and control returns to block 502. Storing the prefix in memory may include communicating the prefix to other routers of the privacy domain.

In a second embodiment for computing the assigned prefix, it is assumed that there are extra or spare bits available in the second, routing prefix portion $P_R$. This portion is usually 48 bits long, but this length may vary from implementation to implementation. Further, it is assumed that the actual routing prefix is only y bits long, where y≤48. In that case, there are 48-y spare bits. If 48-y is sufficiently large, on the order of 10 to 30 bits in one example, these bits can be used to carry a nonce for a message authentication code (MAC). A message authentication code is a bit string that is a function of both data (either plaintext or cipher-text) and a secret key, and that is attached to the data in order to allow data authentication. The function used to generate the message authentication code must be a one-way function. Data associated with an authenticated message allows a receiver to verify the integrity of the message. In this embodiment, then, only valid routers or other entities can compute the right prefix for the IP address. The router can compute the assigned prefix as follows.

$$P^*_{(R,i)} = P_R \oplus MAC_k(\text{Nonce}_i, M_i)$$

The assigned prefix $P'_{(R,i)}$ is a concatenation of (a) the result of an exclusive OR operation or other logical combination of they bit actual prefix and y bit message authentication code MAC computed over the nonce and the host configured suffix, using a shared key k among the routers, and (b) the 48-y bit nonce.

FIG. 6 illustrates an assigned IP address 600 in accordance with this embodiment. The address 600 includes a prefix 602 and a suffix 604. The prefix is determined as described above and includes a privacy domain subnet prefix portion $P_0$ 606, the assigned prefix $P^*_{(R,i)}$ 608 and the nonce $\text{Nonce}_i$ 610. In one exemplary embodiment, the actual prefix $P_R$ 608 would require only 18 bits, leaving 30 bits for the nonce 610.

A host i can use the IP address ($P_0$, $P^*_{(R,i)}$, $\text{Nonce}_i$, $M_i$) for communication with any other host within or outside the privacy domain. When a router outside the privacy domain encounters a packet destined for IP address ($P_0$, $P^*_{(R,i)}$, $\text{Nonce}_i$, $M_i$), the router routes the packet to the link going to a subnet associated with addresses having the prefix $P_0$. When a router inside the privacy domain encounters this packet, it can compute the actual routing prefix ($P_0 P_R$) for this packet by computing the message authentication code using key K over $\text{Nonce}_i$ and $M_i$ contained in the IP header, XOR-ing the message authentication code with $P^*_{(R,i)}$ which is also contained in the IP address, and then concatenating the result with $\text{Nonce}_i$.

A key is information such as a sequence of random or pseudorandom binary digits used initially to set up and periodically change the operations performed in crypto-equipment for the purpose of encrypting or decrypting electronic signals. A nonce is defined in cryptography as a time-variant parameter, such as a counter or a time stamp that is used in key management protocols to prevent message replay and other types of attacks. In the present context, the nonce $Nonce_i$ is a random number picked by the router at the time of pseudo prefix generation. The router may ensure that it picks a different random number for every host in the subnet, but that is not mandatory. The described system and the method will work, albeit with lower security, if the router does not use random or varying nonces.

FIG. 7 illustrates calculation of a routing prefix in accordance with this embodiment. FIG. 7 shows one detailed implementation of block 506 of FIG. 5. After determining that the routing prefix corresponding to the pseudo prefix is not stored in memory, block 504 of FIG. 5, at block 702 of FIG. 7, a router computing the routing prefix for an IP address first computes the message authentication code. At block 704, the resulting message authentication code is logically combined with the assigned prefix $P^*_{(R,i)}$. In one embodiment, the logical combination is an exclusive OR operation. Finally, at block 706, the result from block 704 is concatenated with the nonce to produce the actual routing prefix $P'_{(R,i)}$.

From FIG. 7, control proceeds to block 508, FIG. 5. Once the actual prefix is determined, a conventional simple routing table lookup may be used by the router to make the actual routing decision. The routers may cache the results of above computation for a given IP address, to avoid re-computing the routing prefix for every packet and speed up the routing process.

In a third embodiment, the assigned prefix is an encryption of the actual prefix $P_R$. The key used for encryption is computed as a hash of the configured suffix $M_i$ of the host and a shared secret among the routers.

$$P'_{(R,i)} = \text{Encrypt}_{Ki}(P_R)$$

$$Ki = \text{hash}(Secret, M_i)$$

As with the other embodiments above, a host i can use an IP address $(P_0, P'_{(R,i)} M_i)$ for communication with any other host within or outside the privacy domain. When a router outside the privacy domain encounters a packet destined for IP address $(P_0, P'_{(R,i)} M_i)$, the router routes the packet to a link going to a subnet addressed with the prefix $P_0$. When a router inside the privacy domain encounters this packet, the router can compute the actual routing prefix $(P_0 P_R)$ for this packet by first generating a key K using hash of shared secret and the suffix $M_i$ in the IP address. Once the key has been generated, the router can easily decrypt $P'_{(R,i)}$ to obtain $P_R$.

FIG. 8 illustrates operation of a router to obtain a prefix in accordance with this third embodiment. FIG. 8 shows one detailed implementation of block 506 of FIG. 5. After determining that the required prefix is not stored in memory, block 504 of FIG. 5, at block 802 of FIG. 8, a router computing the routing prefix for an IP address first generates a decryption key k. In one embodiment, this is done by using a hash of the secret shared among the routers of the privacy domain and the suffix $M_i$ for the host contained in the address as shown above. At block 804, the key k is used to decrypt $P'_{(R,i)}$.

Figure 9:
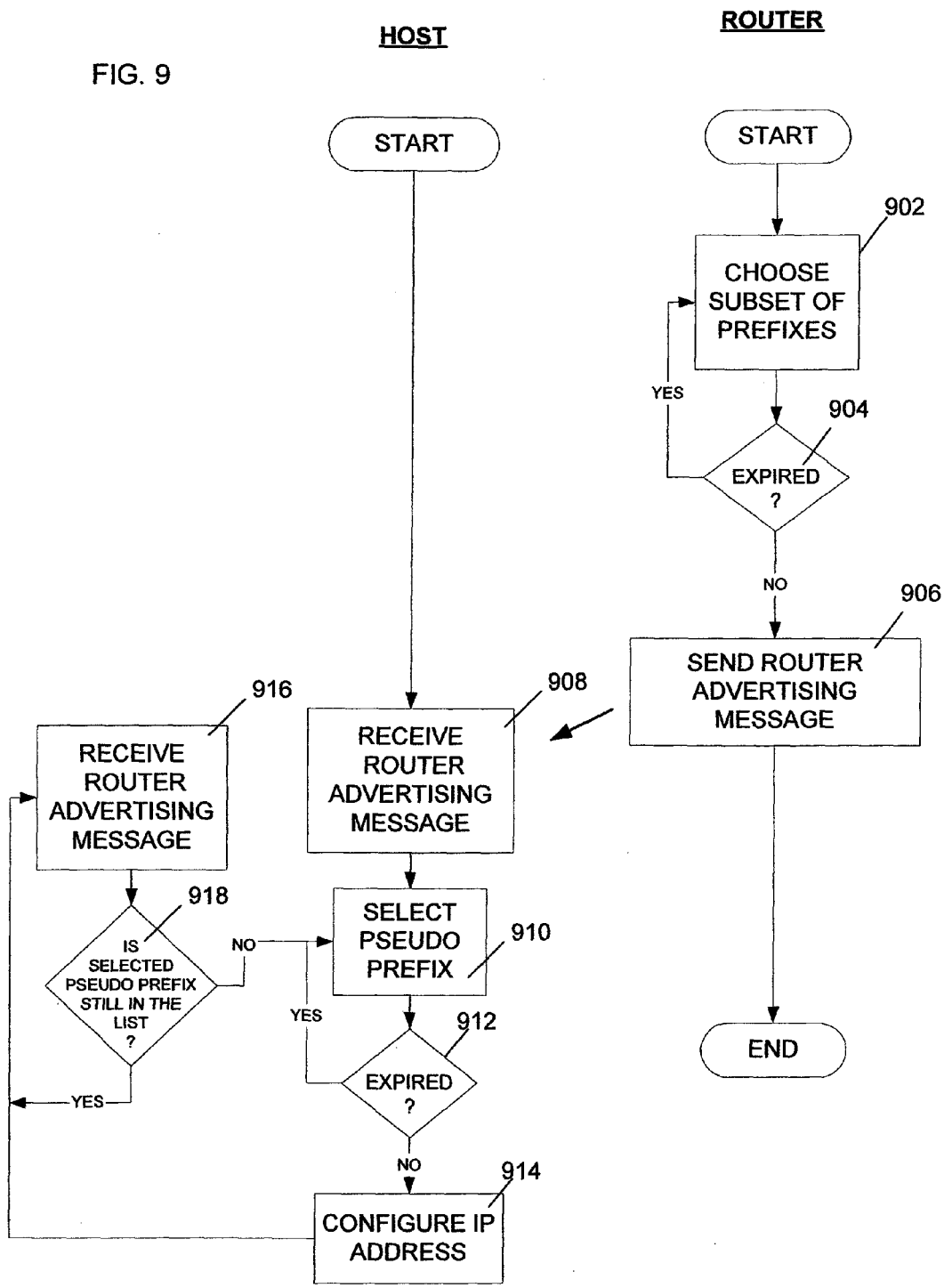
FIG. 9 is a flow diagram illustrating operation of the network of FIG. 1 in accordance with a second embodiment.

As described above, in one exemplary embodiment, an IP suffix is used for prefix generation. In a second embodiment, a router maintains a pool of pseudo prefixes which are used by a host associated with that router to configure a new IP address. FIG. 9 is a flow diagram illustrating one example of this embodiment.

In accordance with this second embodiment, a host in the network may need to configure a new network or IP address. This may happen when the host moves to a new subnet or detects the availability of new router or upon the expiration of a previously assigned IP address or for any other reason. The host must obtain a prefix from a Router Advertisement (RA) message containing available prefixes. RA messages are usually broadcasted or multicasted periodically. The time period between successive advertisements may vary with time and implementation.

Further in accordance with this embodiment, a router R maintains a large set of pseudo-routing prefixes $S_R = \{P'_{(R,1)}, P'_{(R,2)}, P'_{(R,3)}, \ldots P'_{(R,n)}\}$. At block 902, the router chooses a small subset of pseudo routing prefixes from $S_R$. The router prefixes each of the chosen pseudo routing prefixes with a privacy domain prefix $P_0$.

In one embodiment, the router determines if any of the chosen pseudo routing prefixes has expired, block 904. In this embodiment, there is a lifetime associated with each of the pseudo prefixes maintained by the router. Upon expiration of that lifetime, that pseudo prefix may no longer be included in the advertisement messages sent by the router. However, the router may re-introduce the same pseudo prefix at a later time. The router may delete an expired pseudo prefix or replace an expired pseudo prefix by a new one out of the set $S_R$. The router may explicitly indicate the remaining lifetime or an expiration time of the pseudo prefixes in the router advertising message. Alternatively, the router may periodically keep changing the order of pseudo prefixes in the router advertising messages, moving the older ones to the end of the list, until they gradually 'fall off' the list in the router advertising message. Or, the host may implicitly guess the remaining lifetime of a pseudo prefix by looking at its position in the list. If a host configures its IP address using a pseudo-prefix from the subset of pseudo-prefixes advertised by the router, and later that pseudo-prefix disappears from the subset advertised by the router, then the host takes this event as expiration of that pseudo-prefix and chooses a new one from the latest advertised subset of prefixes.

At block 906, the router advertisement message is sent by the router and at block 908, the router advertisement message is received by the host which needs to configure a new IP address.

The host can select any one of the pseudo prefixes advertised by the router and configure its IP address. At block 910, the host selects a pseudo prefix and configures its IP address.

In one embodiment, at block 912 the host determines if the selected pseudo prefix has expired or is in any way invalid. Expiration of a pseudo-prefix may be assumed if the pseudo prefix disappears or 'falls off' the RA message sent periodically by the router. Alternatively there may be an explicit message indicating expiration of a pseudo-prefix or some other mean. If so, control returns to block 910 to select another pseudo prefix. Any hosts that were using the expired pseudo prefix must select a new one out of the advertised prefixes. Otherwise, at block 914, the host configures its IP address. Further details will be provided on this process below. Subsequently, at block 916, the host receives a router advertising message. At block 918, the host tests to see if the pseudo prefix it selected at bloc 910 is still in the list, and therefore still valid. If so, the host waits for receipt of a next router advertising message to verify the validity of the selected prefix, block 916. If the selected pseudo prefix is no longer in the list transmitted from the router, or if the selected pseudo prefix becomes invalid or expired for any other reason, control proceeds to bloc 910 where the host selects another pseudo prefix.

FIG. 10 illustrates one method for computing the set $S_R$ of pseudo prefixes. A router may compute the set of routing prefixes $S_R$ using any suitable method. One exemplary method is described here. Other methods may be substituted.

In the example, a pseudo-routing prefix $P'_{(R,k)}$ belongs to set $S_R$ if $P_R$ can be inferred from Decryption $(P'_{(R,k)})$, for example if $P_R$=Decryption $(P'_{(R,k)})$. This can be achieved in several ways, one of which is described here. If it is assumed that the actual routing prefix $P_R$ is only y bits long, where y<48, then there are m=(48-y) spare bits, and we can have a set $S_R$ with n=$2^m$ possible pseudo routing prefixes. Again here we consider 48 bits because this is the length conventionally dedicated for the prefix. However this value may vary with implementation. The set of pseudo-prefixes may be computed as follows:

for k=1 to n, $P'_{(R,k)}$=Encryption(Combination of y-bit long $P_R$ and m-bit long k).

This is illustrated in FIG. 10. The method of FIG. 10 begins at block 1002, where the indexing variable k is initialized to 1. At block 1004, the indexing variable is tested. If k=n, processing stops. Until k=n, at block 1006 pseudo routing prefixes are calculated according to the relation above. At block 1008, the indexing variable k is incremented and control returns to block 1004. In other embodiments, the set of pseudo-prefixes may be populated in any suitable manner. For example, the entire set of pseudo-prefixes (i.e. all n prefixes) may not be generated in advance. Rather, in some embodiments, the router (or any entity aiding the router) may generate and use pseudo-prefixes on per need basis, particularly since the router only uses a small subset out of the n-element long set $S_R$ at a time.

Decryption of $P'_{(R,k)}$ will result in a number which is the concatenation of the y-bit long $P_R$ and the m-bit long k. The process can obtain the routing prefix $P_R$ by truncation or removal of the m-bits which were combined with $P_R$. before applying encryption as noted above. It is noted that currently, no conveniently available cryptographic process can operate on 48 bit long blocks. Any suitable cryptographic process or device that is available or may be subsequently developed may be used to perform this function.

Figure 11:
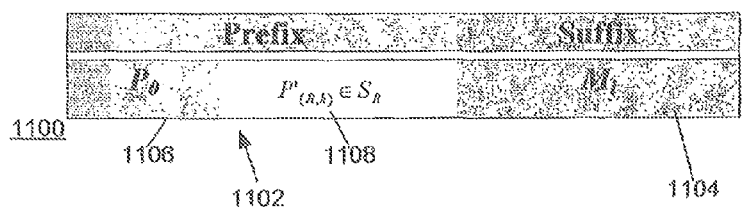
FIG. 11 illustrates an IP address configured by a host according to the method of FIG. 10.

FIG. 11 illustrates an IP address 1100 configured by a host according to the method of FIG. 10. The IP address 1100 includes a prefix 1102 and a suffix 1104. The prefix 1102 includes a privacy domain subnet prefix portion $P_0$ 1106 and one of pseudo-routing prefix $P'_{(R,k)}$ 1108 as computed at block 1006. These portions 1106, 1108 are concatenated with the host suffix $M_i$ 1104 to form the IP address 1100.

A host i can use IP address ($P_0$, $P'_{(R,k)}$ $M_i$) 1100 for communication with any other host within or outside the privacy domain. When a router outside the privacy domain encounters a packet destined for IP address ($P_0$, $P'_{(R,k)}$ $M_i$), the router routes the packet to the link going to the router having an address including prefix $P_0$. When a router inside the privacy domain encounters this packet, it can compute the actual routing prefix ($P_0$ $P_R$) for the packet by decrypting $P'_{(R,k)}$ and truncating m-bits from the result to obtain the routing prefix $P_R$. Since only the routers in the privacy domain have the key to decrypt the pseudo-prefixes, the actual prefix remains hidden.

Similar to the embodiments described above, routers may cache or otherwise store the results of the above computation for any given pseudo prefix to avoid re-computing the routing prefix for every packet and thereby speed up the routing process. The cached values must be invalidated if the secret used for the computation is changed, for example by re-keying.

In a second embodiment, a host can configure not just its own suffix but also its prefix. This method has two variants, as will be described in greater detail below. The first variant uses public key cryptography. The second variant uses more symmetric cryptography to generate the suffix. These two variants can be supplemented and other variants may be substituted as well.

In the first variant, the privacy domain has a public key $K_{(Public)}$ and a corresponding private key $K_{(Private)}$. All the hosts in the privacy domain know the public key $K_{(Public)}$. In contrast, the private key $K_{(Private)}$ is only known to all the routers in a privacy domain.

FIG. 12 illustrates a method for generating prefixes using public key cryptography. At block 1202, the router sends a router advertising message. The router advertises a routing prefix $P^*_R$ that is a function of its actual routing prefix $P_R$, $P^*_R$=$f(P_R)$ and there exists an inverse function $f^{-1}$ such that $P_R$=$f^{-1}$ ($P^*_R$). Application of function $f$ is optional. It may increase security if only all the routers in the privacy domain know the inverse function $f^{-1}$.

At block 1204, the host receives the router advertising message. At block 1206, the host encrypts the prefix $P^*_R$ and uses the public key $K_{(Public)}$ and its desired suffix $M_i$ to obtain a pseudo prefix $P'_{(R,i)}$. At block 1208, the pseudo prefix $P'_{(R,i)}$ and the suffix $M_i$ are concatenated to form the IP address of the host.

A host i can use the IP address ($P_0$, $P'_{(R,i)}M_i$) for communication with any other host within or outside the privacy domain. When a router outside the privacy domain encounters a packet destined for the IP address ($P_0$, $P'_{(R,i)}M_i$), the router routes the packet to a link going to a subnet addressed by the prefix $P_0$. When a router inside the privacy domain encounters this packet, the router can compute the actual routing prefix ($P_0$ $P_R$) for this packet by first decrypting the pseudo prefix $P'_{(R,i)}$ using $K_{(Private)}$ and $M_i$ to obtain $P^*_R$. Next, the router applies the inverse functions $f^{-1}$ to obtain the routing prefix $P_R$. With the routing prefix $P_R$ and the suffix $M_i$ the router can route the packet to the intended host.

In the second variant, every host i in the privacy domain has a private key $K_i$. Also, every router in the privacy domain has a master key $K_m$ such that any information encrypted using any private key $K_i$ can be decrypted by the common master key $K_m$.

FIG. 13 illustrates a method for generating prefixes using symmetric key cryptography. At block 1302, the router generates a routing prefix $P^*_R$ that is a function of its actual routing prefix $P_R$, where $P^*_R$=$f(P_R)$, and there exists a function $f^{-1}$ such that $P_R$=$f^{-1}$ ($P^*_R$). Application of function $f$ is optional. It may increase the security if only all the routers in the privacy domain know the $f^{-1}$. At block 1304, the router transmits a router advertising message with the routing prefix $P^*_R$. The router advertising message is received at the host at block 1306. The host proceeds to encrypt $P^*_R$ using its private key $K_i$ and its selected suffix $M_i$, block 1308. The result is the pseudo prefix $P'_{(R,i)}$. The pseudo routing prefix $P'_{(R,i)}$ and the suffix are concatenated at block 1310 to form the IP address for the host.

A host i can use the IP address ($P_0$, $P'_{(R,i)}M_i$) for communication with any other host within or outside the privacy domain. When a router outside the privacy domain encounters a packet destined for IP address ($P_0$, $P'_{(R,i)}$ $M_i$), the router routes the packet to a link going to a subnet addressed with the prefix $P_0$. When a router inside the privacy domain encounters this packet, it can compute the actual routing prefix ($P_0 P_R$) for this packet by first decrypting $P'_{(R,i)}$ using the master key $K_m$ and $M_i$ to obtain $P^*_R$. Next it applies the inverse function $f^{-1}$ to obtain the routing prefix $P_R$.

As above, the routers in the privacy domain may cache or otherwise store the results of the above computation for a given IP address in order to avoid re-computing the routing prefix for every packet and speed up the routing process. The stored value for the IP address of a host must be deleted if that host is assigned a new private key. Similarly, all the cached values must be deleted if the master key is changed, referred to as re-Keying.

Above, a constraint was introduced that every host i is allowed to configure a usually 64 bit suffix for its IP address. This suffix is denoted as $M_i$. In some applications, this constraint is not in effect. Examples include scenarios in which a router or a DHCP server assigns the entire address to the host instead of allowing the host to auto-configure the IP address.

The next exemplary embodiment describes a method in which a pseudo IP address or other network address is embedded with a decryption parameter or key. In this example, a host i needs to configure or otherwise obtain a new IP address. This may happen when a host moves into a new subnet or detects availability of a new router, or upon the expiration of the validity of a previously assigned IP address. The new router or DHCP server will assign the complete address to the host.

The host solicits a prefix from the router or DHCP server or any other address assignment entity. The router has a routing prefix $P_R$. The router or DHCP server computes a pseudo IP address $P_0 P'_{(R,i)}$Nonce$_i$ and sends it back to the host. In one embodiment, Nonce$_i$ is a unique random number for each host with the router. Other methods for determining Nonce$_i$ could be substituted. Possible embodiments of a method for computing $P'_{(R,i)}$ are given below. The host uses address $P_0 P'_{(R,i)}$Nonce$_i$ as its complete IP address.

Figure 14:
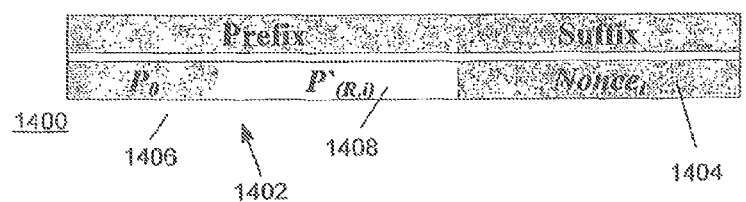
FIG. 14 illustrates an exemplary IP address in accordance with one embodiment.

FIG. 14 illustrates an exemplary IP address 1400 in accordance with this embodiment. The IP address 1400 includes a prefix 1402 and a nonce portion Nonce$_i$ 1404. The prefix 1402 includes a privacy domain subnet prefix portion $P_0$ 1106 and a pseudo routing prefix portion $P'_{(R,k)}$ 1108. These portions 1106, 1108 are concatenated with the nonce portion Nonce$_i$ 1104 to form the IP address 1400.

FIG. 15 is a flow diagram illustrating operation of the network of FIG. 1 in accordance with this embodiment. Here, a host seeks to reconfigure its IP address. The host solicits a prefix from the router, or from a DHCP server or any other suitable address management entity, block 302. The request is received at the router at block 304.

At block 1506, the router computes a pseudo IP address. The router has an assigned routing prefix $P_R$. The router computes the pseudo IP address $P_0 P'_{(R,i)}$ Nonce$_i$ and, at block 1508, returns the pseudo IP address to the host. The host receives the pseudo IP address $P_0 P'_{(R,i)}$Nonce$_i$ at block 1510 and uses it in subsequent communications in the network.

The router may compute the routing prefix $P'_{(R,i)}$ using any of the following methods, or any equivalent method. In a first method, assume that only y bits are used for routing the prefix, where y≤112. In that case, there are 112-y spare bits. If 112-y is sufficiently large, for example, in the range 48 to 64 bits, these spare bits can be used to carry a nonce for a Message Authentication Code (MAC), so that only valid routers or other entities can compute the right prefix. The router can compute the assigned prefix as follows.

$$P'_{(R,i)} = P_R \oplus MAC_k(\text{Nonce}_i).$$

Other calculations may be substituted. It is expected that the actual prefix $P_R$ would require only 18 bits, leaving space for a 94-bit nonce.

A host i can use the IP address ($P_0$, $P'_{(R,i)}$Nonce$_i$) for communication with any other host within or outside the privacy domain. When a router outside the privacy domain encounters a packet destined for IP address ($P_0$, $P'_{(R,i)}$Nonce$_i$), the router routes the packet to a link going to a subnet addressed with the prefix $P_0$. When a router inside the privacy domain encounters this packet, the router can compute the actual routing prefix ($P_0 P_R$) for this packet by computing the message authentication code using Key K over Nonce$_i$ contained in the IP header, and XOR-ing the computed message authentication code with $P'_{(R,i)}$ which is also contained in the IP address. Once the actual prefix is determined, a conventional simple routing table lookup is used for making the actual routing decision.

In a second method, the assigned prefix is an encryption of the actual prefix $P_R$. The key used for encryption is computed as a hash of a nonce Nonce$_i$ which is selected by the router or DHCP server and is guaranteed to be unique for every host in the subnet. The prefix and key may be calculated as shown below.

$$P'_{(R,i)} = \text{Encrypt}_{Ki}(P_R)$$

$$K_i = \text{hash}(\text{Secret}, \text{Nonce}_i)$$

If the DES Data Encryption Standard is used for encryption, the prefixes P and P' are expected to be 64 bits long. Some of these may be stuffed bits.

A host i can use IP address ($P_0$, $P'_{(R,i)}$Nonce$_i$) for communication with any other host within or outside the privacy domain. When a router outside privacy domain encounters a packet destined for IP address ($P_0$, $P'_{(R,i)}$Nonce$_i$), the router routes the packet to a link going to a subnet addressed with the prefix $P_0$. When a router inside the privacy domain encounters this packet, the router can compute the actual routing prefix ($P_0 P_R$) for this packet by first generating a key K using a hash of shared secret and the nonce Nonce$_i$ in the IP address. Once the key has been generated, the router can easily decrypt $P'_{(R,i)}$ to obtain $P_R$.

While a particular embodiment of the present invention has been shown and described, modifications may be made. It is therefore intended in the appended claims to cover such changes and modifications which follow in the true spirit and scope of the invention.

The invention claimed is:

1. A network address assignment method for assigning an address to a host for network communications, the method comprising:
   computing a pseudo prefix incorporating an encryption of a subnet address associated with a subnet associated with the host; and
   communicating the pseudo prefix to the host for use as part of said address assigned to the host, the address being for use by the host as the host's address in network communications, the address being for use as a destination address in communications sent to the host, wherein the pseudo prefix in the destination address is for being decrypted to obtain the subnet address to route such communications to the host.

2. The network address assignment method of claim 1 wherein the pseudo prefix is computed in response to the host requesting an address over a network.

3. The network address assignment method of claim 1 wherein the pseudo prefix is communicated to the host over a network.

4. The network address assignment method of claim 1 wherein the pseudo prefix is not equal to a prefix advertised by any router connected to the subnet.

5. The method of claim 1 wherein computing the pseudo prefix comprises logically combining a suffix of the address of the host with a shared secret key.

6. The network address assignment method of claim 5 wherein the computed pseudo prefix is specific to the host and a router associated with the host.

7. The network address assignment method of claim 1 wherein the pseudo prefix comprises a common prefix shared by all routers in the privacy domain.

8. The network address assignment method of claim 5 wherein logically combining comprises exclusive-OR-ing the suffix with the shared secret key.

9. A network address assignment method for assigning an address to a host for network communications, the method comprising:
   computing a pseudo prefix incorporating an encryption of a subnet address associated with a subnet associated with the host; and
   communicating the pseudo prefix to the host for use as part of said address assigned to the host, the address being for use by the host as the host's address in network communications;
   wherein:
   the host and the subnet are part of a privacy domain comprising a plurality of subnets and one or more routers;
   the pseudo prefix includes an unencrypted portion of the subnet address;
   the one or more routers inside the privacy domain are provided with cryptographic information for decrypting the pseudo prefix to obtain the subnet address when routing data to the host, but the privacy domain does not provide the cryptographic information to one or more routers outside the privacy domain, the one or more routers outside the privacy domain being operable to route data to at least one router in the privacy domain using the unencrypted portion of the pseudo prefix.

10. The method of claim 9 wherein the pseudo prefix does not include a prefix portion equal to any prefix advertised by any router of the privacy domain.

11. A network address assignment method for assigning an address to a host for network communications, the method comprising:
   receiving an address request from the host associated with a router in a network;
   computing a pseudo prefix including logically combining an actual routing prefix and a message authentication code computed over nonce data and a suffix of the address of the host to produce a result; and
   communicating the pseudo prefix to the host for use as part of said address assigned to the host, the address being for use by the host as the host's address in network communications.

12. The network address assignment method of claim 11 wherein computing the pseudo prefix comprises:
   concatenating the result with the nonce data to form the pseudo prefix.

13. The network address assignment method of claim 11 wherein the pseudo prefix is combined with a common prefix shared by all routers in a subnetwork.

14. The network address assignment method of claim 13 wherein the pseudo prefix is computed in response to the host requesting an address over a network.

15. The network address assignment method of claim 13 wherein the pseudo prefix is communicated to the host over a network.

16. The network address assignment method of claim 13 wherein the pseudo prefix is not equal to a prefix advertised by any router in the subnetwork.

17. A network address assignment method for assigning an address to a host associated with a router in a network, wherein the host and the router are part of a privacy domain, the method comprising:
   receiving an address request from the host;
   computing a pseudo prefix, including encrypting an actual routing prefix of the router using an encryption key; and
   communicating the pseudo prefix to the host, the host using the pseudo prefix to configure the host's address, said address being for use as a destination address both in packets destined to the host and originating inside the privacy domain and in packets destined to the host and originating outside the privacy domain;
   wherein each router inside the privacy domain is provided with cryptographic information for decrypting the pseudo prefix to obtain the actual routing prefix when routing data to the host, but the privacy domain does not provide the cryptographic information to one or more routers outside the privacy domain, the one or more routers outside the privacy domain being operable to forward data to at least one router in the privacy domain without decrypting the pseudo prefix.

18. The network address assignment method of claim 17 wherein computing the pseudo prefix comprises:
   computing the encryption key as a hash of a suffix of the address of the host and secret information shared with other routers of the network.

19. A network address assignment method for assigning a network address to a host for network communications, the method comprising:
   receiving an address request from the host associated with a router in a network;
   computing a network address, the network address including
      1) a common routing prefix shared between all routers in the network,
      2) a pseudo prefix portion,
      3) data including a number generated by the router, referred to as nonce; and
   communicating the network address to the host for use by the host as the host's network address in network communications.

20. The network address assignment method of claim 19 wherein computing the pseudo prefix portion comprises:
   logically combining a routing prefix of the router and a message authentication code.

21. The network address assignment method of claim 20 wherein computing the pseudo prefix portion further comprises:
   computing the message authentication code over the nonce data.

22. The network address assignment method of claim 19 wherein computing the pseudo prefix portion comprises:
   encryption of the routing prefix of the router.

23. The network address assignment method of claim 22 wherein computing the pseudo prefix portion further comprises:
   encryption of the routing prefix of the router using an encryption key based on a hash computed over the nonce and the shared secret information between the routers.

24. A method for routing a data packet in a network, the method comprising:
receiving the data packet over the network, the data packet comprising a destination address comprising a pseudo prefix comprising an encryption of a subnet address associated with the data packet's destination;
decrypting the destination address to decrypt said encryption of the subnet address to obtain the subnet address; and
forwarding said data packet over a network in accordance with the subnet address to deliver said data packet comprising said destination address comprising said encryption of said subnet address to the data packet's destination.

25. The method of claim 24 wherein decrypting the destination address comprises:
logically combining a portion of the destination address with secret information.

26. The method of claim 25 wherein logically combining comprises:
exclusive OR-ing at least a portion of the pseudo prefix and a suffix of the destination address with the secret information.

27. The method of claim 25 wherein decrypting the destination address comprises:
logically combining at least a portion of the pseudo prefix and a suffix of the destination address with secret information to produce the subnet address.

28. The method of claim 24 wherein decrypting the destination address to obtain a subnet address comprises:
computing a message authentication code, and
logically combining the message authentication code with at least a portion of the pseudo prefix of the destination address to produce a result.

29. The method of claim 28 further comprising:
computing the message authentication code using nonce data contained in the data packet;
combining the nonce data with the portion of the pseudo prefix in a concatenation process.

30. The method of claim 24 wherein decrypting the destination address to obtain a subnet address comprises decrypting a pseudo prefix of the destination address to produce an actual routing prefix.

31. The method of claim 24, further comprising:
sharing a public key with routers and hosts;
sharing a private key with only the routers in a privacy domain;
wherein decrypting the destination address comprises:
decrypting a pseudo prefix of the destination address using the private key and a suffix of the destination address to obtain a routing prefix, and
determining an actual routing prefix from the routing prefix.

32. The method of claim 24, further comprising:
each host having a private key;
sharing a master key among the routers;
wherein decrypting the destination address comprises:
decrypting a pseudo routing prefix of the destination address using the master key to produce the routing prefix; and
determining an actual routing prefix from the routing prefix.

33. The method of claim 32 wherein any information encrypted using the private key may be decrypted using the master key shared among the routers.

34. A method for routing a data packet in a network, the method comprising:
receiving the data packet over the network, the data packet comprising a destination address comprising an encryption of a subnet address associated with the data packet's destination;
decrypting the destination address to obtain the subnet address; and
forwarding said data packet over a network in accordance with the subnet address to deliver said data packet comprising said destination address comprising said encryption of said subnet address to the data packet's destination;
wherein decrypting the destination address to obtain a subnet address comprises:
computing a message authentication code, and
logically combining the message authentication code with at least a portion of a pseudo prefix of the destination address to produce a result;
wherein the message authentication code is keyed with some secret information shared between routers of the network and computed over nonce data contained in the destination address and a suffix of the destination address.

35. A method for routing a data packet in a network, the method comprising:
receiving the data packet over the network, the data packet comprising a destination address comprising an encryption of a subnet address associated with the data packet's destination;
decrypting the destination address to obtain the subnet address; and
forwarding said data packet over a network in accordance with the subnet address to deliver said data packet comprising said destination address comprising said encryption of said subnet address to the data packet's destination;
wherein decrypting the destination address to obtain a subnet address comprises:
generating a decryption key using a portion of the destination address, and
decrypting a pseudo prefix of the destination address to produce the routing prefix.

36. The method of claim 35 wherein generating the decryption key comprises:
generating the decryption key using a hash of secret information and a suffix of the destination address.

37. A method for routing a data packet in a network, the method comprising:
receiving the data packet over the network, the data packet comprising a destination address comprising a pseudo prefix comprising an encryption of a subnet address associated with the data packet's destination;
decrypting the destination address to obtain the subnet address; and
forwarding said data packet over a network in accordance with the subnet address to deliver said data packet comprising said destination address comprising said encryption of said subnet address to the data packet's destination;
wherein decrypting the destination address to obtain a subnet address comprises:
generating a key using a hash of shared secret information and nonce data of the destination address, and
decrypting the destination address using the key to produce the subnet address.

38. A method for routing a data packet in a network, the method comprising:

receiving the data packet over the network, the data packet comprising a destination address comprising an encryption of a subnet address associated with the data packet's destination;

decrypting the destination address to obtain the subnet address; and forwarding said data packet over a network in accordance with the subnet address to deliver said data packet comprising said destination address comprising said encryption of said subnet address to the data packet's destination;

wherein decrypting the destination address to obtain a subnet address comprises:

using a key, computing a message authentication code over nonce data contained in the destination address; and logically combining the message authentication code with a pseudo prefix contained in the destination address.

39. A method for configuring a new internet protocol (IP) address, the method comprising:

at a network host, requesting an address prefix;

receiving a pseudo prefix computed using an encryption of a routing prefix of a router associated with the host; and the host combining the pseudo prefix with a suffix of the host to form the new IP address, and using the new IP address as the host's address in network communications.

40. The method of claim 39 wherein receiving the pseudo prefix comprises receiving a prefix computed using a cryptographic process and a secret key at the router.

41. A method for operating a router in a communication network, the method comprising:

receiving a packet;

reading a destination address from the packet, the destination address comprising a pseudo prefix;

determining a network routing prefix from the destination address, wherein determining the network routing prefix comprises using secret information and a cryptographic process;

caching the network routing prefix determined above for later use; and forwarding the packet in accordance with the network routing prefix to deliver the packet comprising said destination address to which the determining operation with the cryptographic process was applied to the packet's destination specified by the destination address.

42. The method of claim 41 further comprising:
receiving a subsequent packet;
retrieving the cached network routing prefix; and
forwarding the subsequent packet over a network to a network address corresponding to the cached network routing prefix.

43. The method of claim 41 further comprising:
sharing the secret information with other routers of a defined privacy domain.

44. The method of claim 41 further comprising:
updating the cached network routing prefix if the secret information changes.

45. A method for network communication in a network comprising a privacy domain comprising a plurality of networked devices comprising one or more routers, the network domain comprising a plurality of subnets, wherein each of said devices is associated with at least one of said subnets, and each of said subnets is associated with at least one subnet address corresponding to a prefix of an address of a networked device, the method comprising the one or more routers of the privacy domain advertising prefixes associated with the subnet addresses, but at least one of the networked devices in the privacy domain having an address whose prefix is a pseudo prefix which does not coincide with any of the advertised prefixes and yet said at least one of the network devices is for receiving communications with said address as the destination address.

46. The method of claim 45 wherein the one or more routers of the privacy domain are provided with a key for decrypting the prefix of the address of said at least one of the networked devices.

47. The method of claim 45 wherein the prefix of the address of said at least one of the networked devices comprises a portion common to the advertised prefixes, to allow a router outside the privacy domain to route a packet with the address of said at least one of the networked devices to the privacy domain.

48. A method for delivering a data packet over a network to a host in a privacy domain, the data packet having a destination address comprising a pseudo prefix comprising an encrypted portion of a subnet address of a subnet associated with the host and an unencrypted portion of the subnet address, the method comprising:

routing the packet by one or more routers outside the privacy domain to a router in the privacy domain using the unencrypted portion of the pseudo prefix without decrypting the encrypted portion; and routing the packet by one or more routers inside the privacy domain by decrypting the encrypted portion, the encrypted portion remaining in the destination address in the packet as the packet is transmitted by the one or more routers inside the privacy domain.

49. An apparatus adapted to perform the method of claim 1.

50. An apparatus adapted to perform the method of claim 11.

51. An apparatus adapted to perform the method of claim 17.

52. An apparatus adapted to perform the method of claim 19.

53. An apparatus adapted to perform the method of claim 24.

54. An apparatus adapted to perform the method of claim 39.

55. An apparatus adapted to perform the method of claim 41.

56. An apparatus adapted to perform the method of claim 45.

57. An apparatus adapted to perform the method of claim 9.

58. A plurality of routers adapted to perform the method of claim 48.

59. An apparatus adapted to perform the method of claim 22.

60. An apparatus adapted to perform the method of claim 34.

61. An apparatus adapted to perform the method of claim 39.

62. An apparatus adapted to perform the method of claim 35.

63. An apparatus adapted to perform the method of claim 37.

64. An apparatus adapted to perform the method of claim 38.

* * * * *